(12) United States Patent
Yu et al.

(10) Patent No.: US 11,483,241 B2
(45) Date of Patent: Oct. 25, 2022

(54) NETWORK TRAFFIC METERING CREDIT DISTRIBUTION IN NETWORK DEVICE HAVING MULTIPLE PROCESSING UNITS

(71) Applicant: Fortinet, Inc., Sunnyvale, CA (US)

(72) Inventors: Mengchen Yu, Pleasanton, CA (US); Guansong Zhang, Mountain view, CA (US)

(73) Assignee: Fortinet, Inc., Sunnyvale, CA (US)

( * ) Notice: Subject to any disclaimer, the term of this patent is extended or adjusted under 35 U.S.C. 154(b) by 49 days.

(21) Appl. No.: 17/039,832

(22) Filed: Sep. 30, 2020

(65) Prior Publication Data

US 2022/0103474 A1 Mar. 31, 2022

(51) Int. Cl.
| | |
|---|---|
| *H04L 45/74* | (2022.01) |
| *H04L 45/00* | (2022.01) |
| *H04L 47/70* | (2022.01) |
| *H04L 47/762* | (2022.01) |
| *H04L 47/783* | (2022.01) |
| *H04L 47/74* | (2022.01) |

(52) U.S. Cl.
CPC .............. *H04L 45/74* (2013.01); *H04L 45/22* (2013.01); *H04L 47/745* (2013.01); *H04L 47/762* (2013.01); *H04L 47/783* (2013.01); *H04L 47/822* (2013.01)

(58) Field of Classification Search
CPC ....... H04L 45/74; H04L 45/22; H04L 47/745; H04L 47/762; H04L 47/783; H04L 47/822
See application file for complete search history.

(56) References Cited

U.S. PATENT DOCUMENTS

| | | | |
|---|---|---|---|
| 7,908,390 B2 | 3/2011 | Takase et al. | |
| 7,948,882 B2 | 5/2011 | Chin et al. | |
| 10,284,475 B2 | 5/2019 | Gholmieh et al. | |
| 10,419,965 B1* | 9/2019 | Kadosh | H04L 61/2592 |
| 2006/0067233 A1 | 3/2006 | Fukuda et al. | |
| 2014/0351106 A1* | 11/2014 | Furr | H04M 15/43 |
| | | | 705/34 |
| 2015/0236968 A1* | 8/2015 | Zhang | H04L 43/0894 |
| | | | 370/230 |
| 2017/0149678 A1* | 5/2017 | Dumitrescu | H04L 47/215 |

FOREIGN PATENT DOCUMENTS

EP 2728812 5/2016

* cited by examiner

*Primary Examiner* — Jung H Park
(74) *Attorney, Agent, or Firm* — Law Office of Dorian Cartwright; Dorian Cartwright

(57) ABSTRACT

Systems and methods for network traffic metering credit distribution and packet processing in a network device having multiple processing units are provided. According to an embodiment, management of multiple meters is distributed among multiple processing units of a network device. Each meter is implemented in a form of a master entry and a slave entry. Responsive to receipt by one of the processing units of a packet subject to rate-limiting by a meter, an action to be taken on the packet is made with reference to a slave entry managed by the processing unit based on available credit of the slave entry. When the action indicates the packet is to be passed: (i) credits associated with passing the packet are deducted from the available credit; and (ii) the packet is passed to a subsequent stage of packet processing; otherwise, the packet is dropped.

9 Claims, 11 Drawing Sheets

600

| FIELD | QW | POSITION | COMMENT |
|---|---|---|---|
| SLAVE_ADDR | 0 | 23:0 | SLAVE ENTRY ADDRESS |
| SLAVE_CHIP_ID | 0 | 31:24 | SLAVE CHIP ID |

| FIELD | QW | POSITION | COMMENT |
|---|---|---|---|
| SLAVE_ADDR | 0 | 23:0 | SLAVE ENTRY ADDRESS |
| CREDIT | 1 | 23:0 | CREDIT GRANT |

FIG. 6B

NETWORK TRAFFIC METERING CREDIT DISTRIBUTION IN NETWORK DEVICE HAVING MULTIPLE PROCESSING UNITS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to packet processing in a network device. In particular, embodiments of the present invention relate to distributed network traffic metering and packet processing in a network device having multiple processing units.

Description of the Related Art

To rate-limit packets of certain types, network devices perform network traffic metering. While there are differences among network device vendors, at present, network devices may be classified into three general performance categories, including entry-level, mid-range, and high-end network devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network devices may include a CPU and no co-processors or a system-on-a-chip (SoC) processor that combines a CPU, a CP, and an NP. Mid-range network devices may include a multi-core CPU, a separate NP Application-Specific Integrated Circuits (ASIC), and a separate CP ASIC. At the high-end, network devices may have multiple NPs and/or multiple CPs.

Network traffic metering is typically modeled in accordance with a leaky bucket algorithm with periodic credit refreshes and implemented by the NP. The leaky bucket implementation works well within a network device having a single-chip NP implementation in which the NP may be said to include a single processing unit; however, complexities arise in the context of a network device having a multi-chip NP architecture (multiple processing units).

SUMMARY

Systems and methods are described for network traffic metering credit distribution and packet processing in a network device having multiple processing units. According to an embodiment, management of multiple meters is distributed among multiple processing units of a network device. Each meter is implemented in a form of a master entry managed by one of the multiple processing units and a slave entry managed by each processing unit of the multiple processing units. Responsive to receipt of a packet by a first processing unit that is subject to rate-limiting by a first meter, a determination is made by the first processing unit with reference to a slave entry of multiple slave entries managed by the first processing unit and corresponding to the first meter whether the packet is to be passed or dropped based on available credit of the slave entry. When the determination indicates the packet is to be dropped, the first processing unit drops the packet. When the determination indicates the packet is to be passed: (i) an amount of credit associated with passing the packet is deducted from the available credit; and (ii) the packet is passed to a subsequent stage of packet processing.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

FIG. 6A is a table illustrating fields of a credit request message in accordance with an embodiment of the present disclosure.

FIG. 6B is a table illustrating fields of a credit grant message in accordance with an embodiment of the present disclosure.

DETAILED DESCRIPTION

Figure 1:
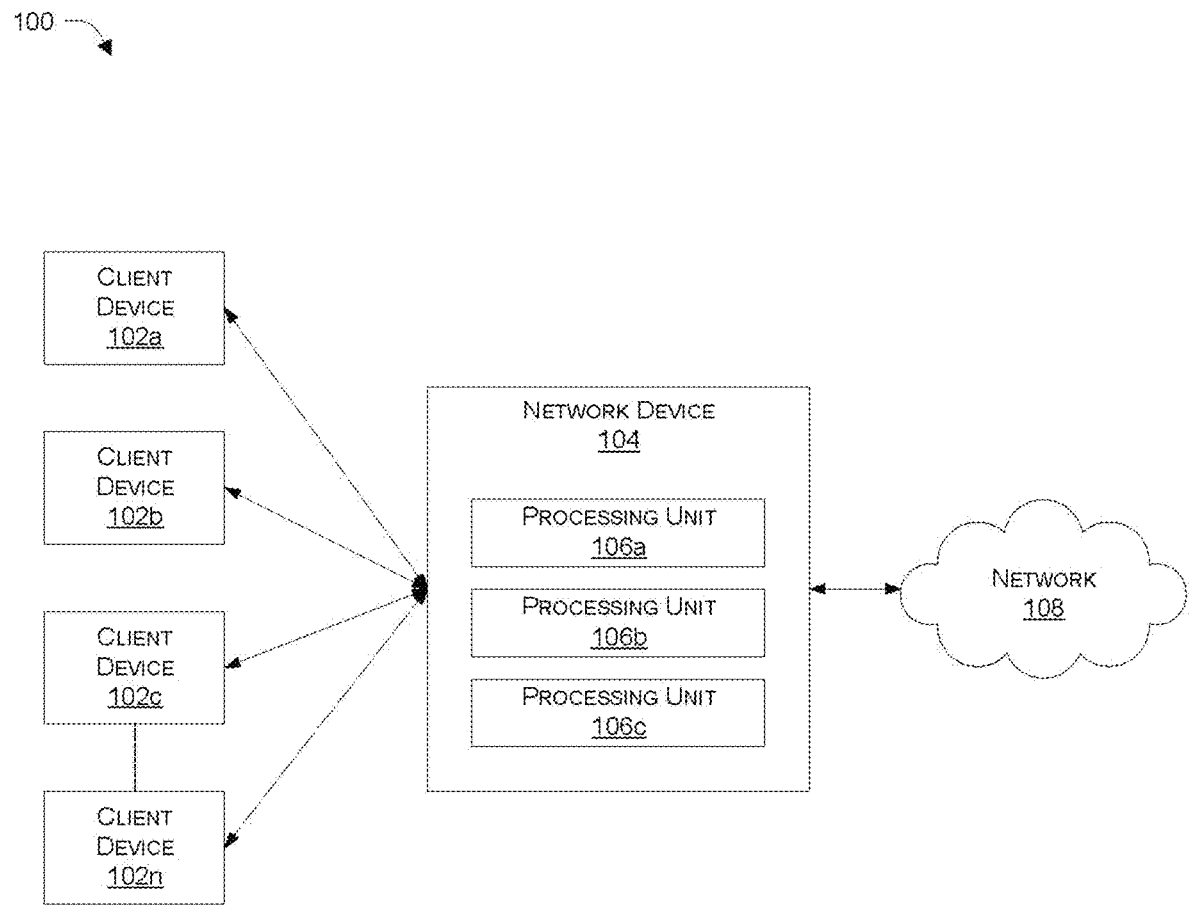
FIG. 1 conceptually illustrates an enterprise network in which network packet processing is performed in accordance with an embodiment of the present disclosure.

Systems and methods are described for network traffic metering credit distribution and packet processing in a network device having multiple processing units. In the context of a network device having a multi-chip NP architecture, referred to herein more generally as a network device having multiple processing units, one option for applying rate limiting to packets that are subject to the same metering entry and that may be distributed to multiple chips is to forward all packets to the master chip (or master processing unit) that manages all metering entries and which can make all metering decisions. Notably, however, while this centralized meter management approach is relatively simple to implement this simplicity is at the expense of moving packets around the processing units. All of the processing units ultimately forwarding packets to the master processing unit will result in excessive packet traffic on the master processing unit and defeats the purpose of load balancing. Moreover, rate-limiting packets subject to multiple metering entries exacerbates the aforementioned problem and makes multiple metering difficult to implement.

As such, embodiments described herein seek to address various issues arising in the context of a network device having multiple processing units by distributing credits of a master metering entry via messages to multiple processing units in the system instead of forwarding packets to the master processing unit that maintains the metering configuration entry. Additionally, as described in further detail below, each processing unit may maintain its metering entry (called a slave entry) whose credit comes from the metering entry of the master processing unit via credit request and grant messages. In this manner, the bandwidth requirement of credit distribution is expected to be significantly lower than that of packet forwarding and is independent of the metering rate, thereby addressing the excessive packet forwarding traffic issue and keeping the load balancing among the multiple processing units intact.

Embodiments of the present invention include various steps, which will be described below. The steps may be performed by hardware components or may be embodied in machine-executable instructions, which may be used to cause a processing resource (e.g., general-purpose or special-purpose processor) programmed with the instructions to perform the steps. Alternatively, steps may be performed by a combination of hardware, software, firmware, and/or by human operators.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

The phrase "traffic policing" generally refers to allowing or dropping packets based on a maximum allowed traffic policing rate threshold. For example, the rate of incoming traffic may be measured and packets that exceed the maximum allowed traffic policing rate, which may be represented in the form of a meter, are dropped.

The phrase "traffic shaping" generally refers to the buffering of packets based on a maximum allowed traffic shaping rate threshold. For example, input packets may be transmitted when within the maximum allowed traffic shaping rate threshold, which may be implemented in the form of a meter, and may be queued to control the rate at which they are output.

As used herein the terms "rate-limiting" or "metering" generally encompasses both traffic policing and traffic shaping.

As used herein a "slave processing unit" generally refers to a processing unit that manages a slave entry of a meter and a "master processing unit" generally refers to a processing unit that manages a master entry of a meter. In various examples described herein, a processing unit may manage both a slave entry for a particular meter and the corresponding master entry for the particular meter. Such a processing unit may be referred to as a slave processing unit when referring to slave functionality (e.g., making pass/drop decisions for packets and updating credit for the particular meter) performed by the processing unit and may be referred to as a master processing unit when referring to master functionality (e.g., accumulating credits and distributing credits for the particular meter) performed by the processing unit.

FIG. 1 conceptually illustrates an enterprise network 100 in which network packet processing is performed in accordance with an embodiment of the present disclosure. In the present example, the enterprise network 100 includes a network device 104 having multiple processing units (e.g., processing units 106a-c), which may be individually referred to as a processing unit 106 and collectively referred to as processing units 106. Non-limiting examples of the network device 104 include a switch, a router, or a network security device.

The processing units 106 may be of the same or different types, for example, including one or more CPUs, NPs, and/or CPs. In one embodiment, the processing units 106 represent multiple NPs that are operable to collectively perform traffic shaping and traffic accounting functions by maintaining a large set of counters in memory (e.g., an external DRAM). The network device 104 may perform traffic shaping to delay some or all packets or datagrams to bring them into compliance with a desired traffic profile. Traffic shaping may be used to optimize or guarantee performance, improve latency, or increase usable bandwidth for some kinds of packets by delaying other kinds. Traffic policing may provide a means to control the volume of traffic being sent into a network in a specified period (bandwidth throttling) and/or the maximum rate at which the traffic is sent.

In a multi-chip system (e.g., a network device having multiple NPs), the flows on different NPs may be subject to the same meter entry (e.g., shaper entry). In an embodiment, the network device 104 may be configured to address various limitations associated with a traditional centralized metering approach by implementing a distributed metering approach as described herein. In general, in the distributed approach, instead of moving packets, metering credits are distributed via messages to each chip (processing unit 106) in the system.

In various examples described herein, the two general functions of a meter (e.g., a shaper), including accumulation of credits as time passes by and deduction of credits as packets are allowed to pass, are separated and perform with respect to two different types of meter entries (e.g., a master entry and a slave entry, respectively). In one embodiment, in a system of N chips, each meter has one master entry and N slave entries, one associated with or managed by each chip. Processing units 106 that manage a master entry may be responsible for (i) credit accumulation within the master entry and (ii) distribution of credits among the slave entries. Management of slave entries by processing units 106 may involve (i) making pass/drop decisions for packets, (ii) requesting credit refresh, and (iii) updating the credits associated with the slave entry as appropriate. When the available credit in a particular slave entry is below a threshold, the processing unit that manages the particular slave entry requests a credit refill from the processing unit that manages the corresponding master entry. In the distributed approach described herein, the bandwidth requirements for credit distribution may be significantly lower than that of packet forwarding.

In one embodiment, to ensure fairness and consistent operations, when the slave entry and the corresponding master entry are managed by the same processing unit, the slave functionality of the processing unit transmits a credit request message to the master functionality of the processing unit in the same manner as slave functionality of other processing units would to master functionality of a remote processing unit. Similarly, the master functionality of the processing unit transmits a credit grant message to the slave functionality of the processing unit in the same manner as master functionality of other processing units would to slave functionality of a remote processing unit. In order to balance the message flow, the responsibility for management of master entries of various meters may be evenly distributed among all processing units 106.

The network device 104 may maintain multiple bandwidth throttling meters and/or rate-limiting meters to perform traffic shaping. Non-limiting examples of the multiple meters, each associated with rate-limiting different aspects of network packet processing or bandwidth throttling, include a packet rate meter, a frame rate meter, a byte rate-limiting meter, a bit rate-limiting meter, a jitter tolerance meter, a delay variation tolerance meter, a maximum burst size meter, and application-specific meters. As those skilled in the art will appreciate, the network device 104 may make use of several such meters in accordance with various security rules, traffic monitoring policies, and/or traffic shaping policies.

The network device 104 may receive traffic packets from client devices 102a-n and may perform metering in a distributed manner using processing units 106a-c. The network device 104 may perform metering on traffic packets entering and/or leaving the network 108 and/or traffic packets related to internal communication between the client devices 102a-n.

In various examples described herein, when a particular processing unit 106 is said to manage a master entry of a particular meter this means the particular processing unit 106 is responsible for performing master functionality (e.g., credit accumulation and credit distribution) for the particular meter. Similarly, when a particular processing unit 106 is said to manage a slave entry of a particular meter this means the particular processing unit 106 is responsible for performing slave functionality (e.g., making pass/drop decisions for packets being locally processed by the particular processing unit 106, deducting credits as packets are allowed to pass, and requesting additional credits as needed) for the particular meter. Depending upon the particular implementation, the information (e.g., a timestamp and available credits) associated with a master entry or a slave entry may be stored local to the processing unit 106 that manages the particular entry or the information may be stored off chip, for example, in an external DRAM. In some embodiment, address and/or offset information may be stored local to the processing unit 106 that identifies where in the external DRAM the managed entry resides. An example of slave processing is described further below with reference to FIGS. 7A-B. An example of master processing is described further below with reference to FIG. 8.

Those skilled in the art will appreciate implementation of metering operations in a distributed manner as described herein may be used for a variety of other types of metering scenarios. So, while for sake of brevity various examples described herein relate to traffic shaping, the network device 104 may perform metering for other purposes including, but not limited to, rate-limiting, bandwidth throttling, and the like.

Figure 2:
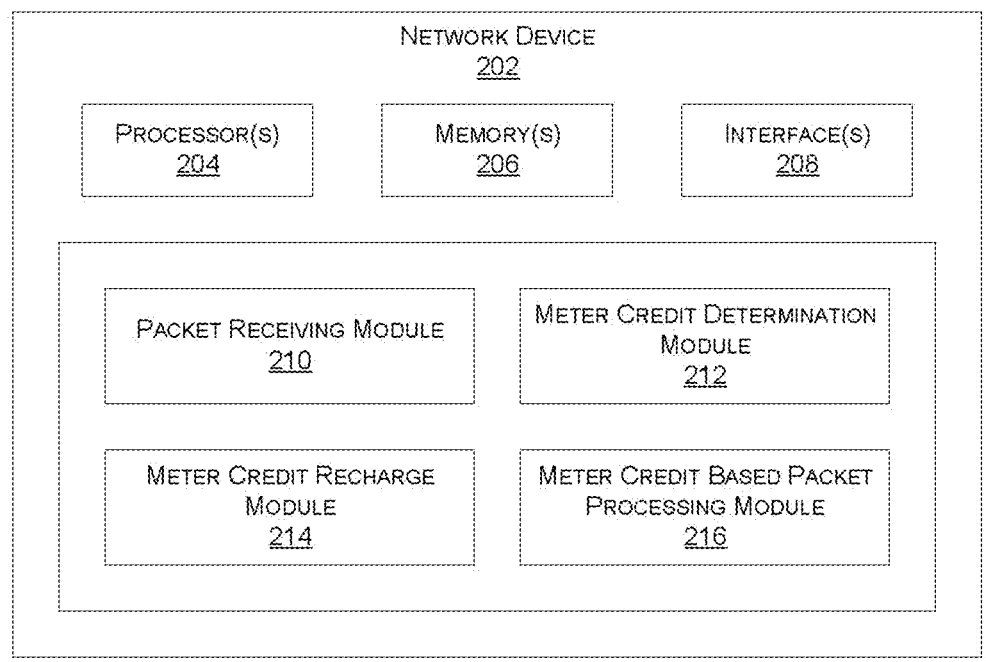
FIG. 2 illustrates the functional modules of a packet processing system in accordance with an embodiment of the present disclosure.

FIG. 2 illustrates the functional modules of a packet processing system (e.g., network device 202) in accordance with an embodiment of the present disclosure. In the context of the present example, the network device 202 includes multiple processing units (e.g., processors 204) operable to execute programmable instructions associated with functional modules stored in memory 206. The network device 202 may have different input-output interfaces 208, including network interfaces for receiving data from and sending traffic packets to other network devices. The interfaces 208 may include an Ethernet interface, a wireless interface, and other communication interfaces. The processor(s) 204 may each manage entries (e.g., master and/or slave entries) for one or more meters to facilitate distributed metering. Depending upon the particular implementation, the meters may include traffic policing and/or traffic shaping meters. In an embodiment, the available credit represents a bandwidth limit specified in terms of a packet rate, a frame rate, a byte rate, or a bit rate. In some embodiments, the available credit represents a burstiness limit specified in terms of a jitter tolerance, a delay variation tolerance, or a maximum burst size.

The network device 202 includes a packet receiving module 210, a meter credit determination module 212, a meter credit recharge module 214, and a meter credit based packet processing module. The packet receiving module 210 is responsible for receiving a packet that is subject to metering by a first meter at a processing unit of the multiple processing units 204.

The meter credit determination module 212 is responsible for determining at the first processing unit with reference to a slave entry corresponding to the first meter whether sufficient credit is available in the slave entry to process the packet (e.g., allow the packet to pass).

The meter credit based packet processing module 216 is responsible for processing the packet based on the determination regarding whether sufficient credit is available. Processing of a packet by the meter credit based packet processing module 216 may include allowing the packet to pass or dropping the packet based on available credit in the slave entry.

In an embodiment, the meter credit based packet processing module 216 causes the first processing unit of the network device 202 to drop the packet when insufficient credit is available to process the packet. When sufficient credit is available to process the packet, then the meter credit based packet processing module causes the first processing unit deduct an amount of credit associated with passing the packet from the available credit in the slave entry and allows the packet to pass to a subsequent stage of packet processing. In an embodiment, the subsequent stage includes application of rate-limiting by a second meter of multiple meters applicable to the packet and transmission of the packet onto a network to which the network device is coupled.

The meter credit recharge module 212 may be responsible for causing the first processing unit to request additional credit. For example, when one or more credit refresh conditions are met by the slave entry, the first processing unit may send a credit recharge request message to a second processing unit of the multiple processing units 204 by which the master entry of the first meter is managed. Responsive to receipt of a credit grant via a credit grant message from the second processing unit, the first processing unit may update the available credit for the first meter in the slave entry based on the credit grant. In one embodiment, the one or more credit refresh conditions include (i) the available credit being below a predetermined or configurable credit threshold and (ii) the expiration of a predetermined or configurable request interval. Responsive to determining all credit refresh conditions are satisfied, the meter credit recharge module 212 may cause the first processing unit to send the credit request message to the second processing unit managing the master entry.

Continuing with the above example, in an embodiment, the second processing unit of the multiple processing units 204, by which the master entry of the first meter is managed, receives the credit request message sent from the first processing unit. Responsive to receipt of the credit request message, the second processing unit calculates a number of credits to be granted to the slave entry based on available credit of the particular master entry, deducts the number of credits from the available credit, and grants the number of credits to the slave entry by sending a credit grant message indicating the number of credits to the processing unit managing the slave entry. In one embodiment, the available credit of the particular master entry managed by the second processing unit is increased by a predetermined or configurable credit accumulation amount responsive to expiry of a predetermined or configurable amount of time.

In an embodiment, each processing unit of the multiple processing units 204 may manage a master entry for one or more meters and may also manage one or more slave entries for multiple meters. In an embodiment, a processing unit may perform master functionality for a particular meter as well as slave functionality for a particular meter. Depending on the particular roles assigned to a processing unit for a particular meter, the processing unit may perform the role of master, slave, or both for the particular meter.

Figure 3:
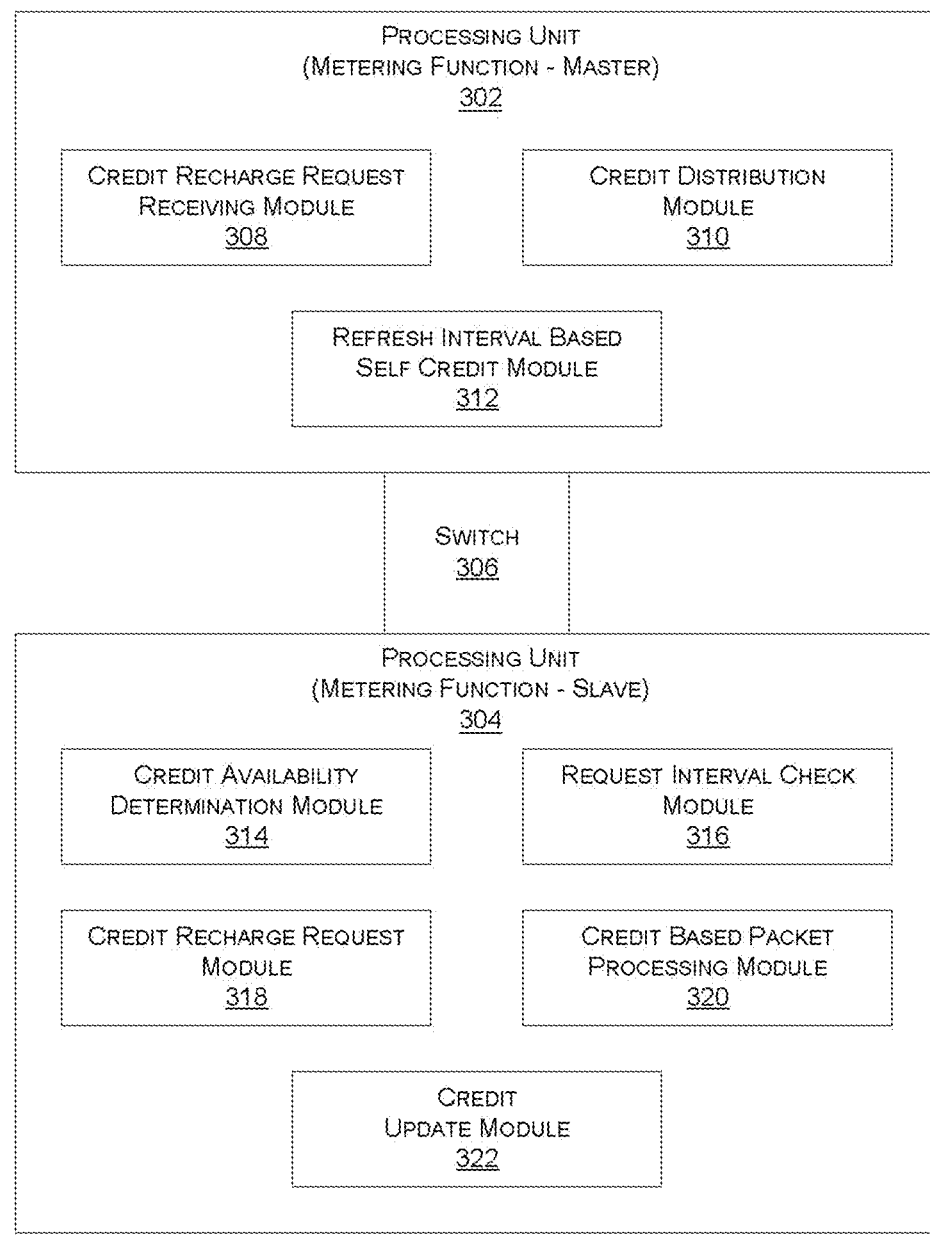
FIG. 3 illustrates functional modules of processing units when operating as a slave or as a master with respect to a particular meter in accordance with an embodiment of the present disclosure.

FIG. 3 illustrates functional modules of processing units when operating as a slave or as a master with respect to a particular meter in accordance with an embodiment of the present disclosure. In an embodiment, for a first meter of multiple of meters that a network device may maintain, a first processing unit 302 may perform master functionality for the first meter and therefore operates as a master with respect to the first meter and the processing unit 304 may perform slave functionality for the first meter and therefore operates as a slave with respect to the first meter, for example, making pass/drop determinations regarding received packets. For a second meter, the processing unit 302 may perform the slave functionality and the processing unit 304 may perform the master functionality for the second meter. While, the present example is explained with reference to two processing units, those skilled in the art will appreciate more than two processing units may be implemented within a particular network device (e.g., network device 104 or 202).

As shown in FIG. 3, the processing unit 302 is configured to manage a master entry for a first meter by performing master metering functionality relating to the first meter and the processing unit 304 is configured to manage the corresponding slave entry for the first meter by performing slave metering functionality. The processing unit 302 and the processing unit 304 may communicate through a switch 306, for example, to exchange credit recharge request messages and credit grant messages.

The processing unit 302 includes a credit recharge request receive module 308, a credit distribution module 310, and a refresh interval based self credit module 312. The credit recharge request receive module 308 is operable to receive a credit recharge request from the processing unit 304. The credit distribution module 310 is operable to calculate a number of credits to be granted to the slave entry based on available credit of the particular master entry and grant the number of credits for the slave entry by sending a credit grant message indicating the number of credits to the processing unit 304. The refresh interval based self credit module 312 is operable to increase available credit by a predetermined or configurable credit accumulation amount on expiry of a predetermined or configurable amount of time.

In the context of the present example, the processing unit 304 includes a credit availability determination module 314, a request interval check module 316, a credit recharge request module 318, a credit based packet processing module 320, and a credit update module 322. The credit availability determination module 314 is operable to determine whether credit available in the slave entry managed by the processing unit 304 is less than a predetermined threshold.

The request interval check module 316 is operable to check whether a time interval has elapsed from the time of the last credit recharge request with respect to the first meter was sent. The credit recharge request module 318 is operable to send a credit recharge request to the processing unit 302 managing the master entry for the first meter when either the credit available in the slave entry for the first meter is less than the predetermined threshold or the time interval has elapsed. The credit based packet processing module 320 is operable to process a packet received at the processing unit 304 that is subject to metering by the first meter based on available credit in the slave entry for the first meter. In an embodiment, the credit based packet processing module 320 may drop the packet when the available credit is less than the credit required to pass the packet and may allow the packet to pass when the available credit is sufficient to pass the packet. The credit update module 322 is operable to update the available credit by accumulating credit received through credit grant messages from the processing unit 302 and deducting credit based on attributes (e.g., size) of the packet that was allowed to pass. Sending of credit recharge request messages by processing units that manage slave entries and granting of credits by processing units that manage corresponding master entries are described in further detail below with reference to FIGS. 7B and 8.

Figure 4:
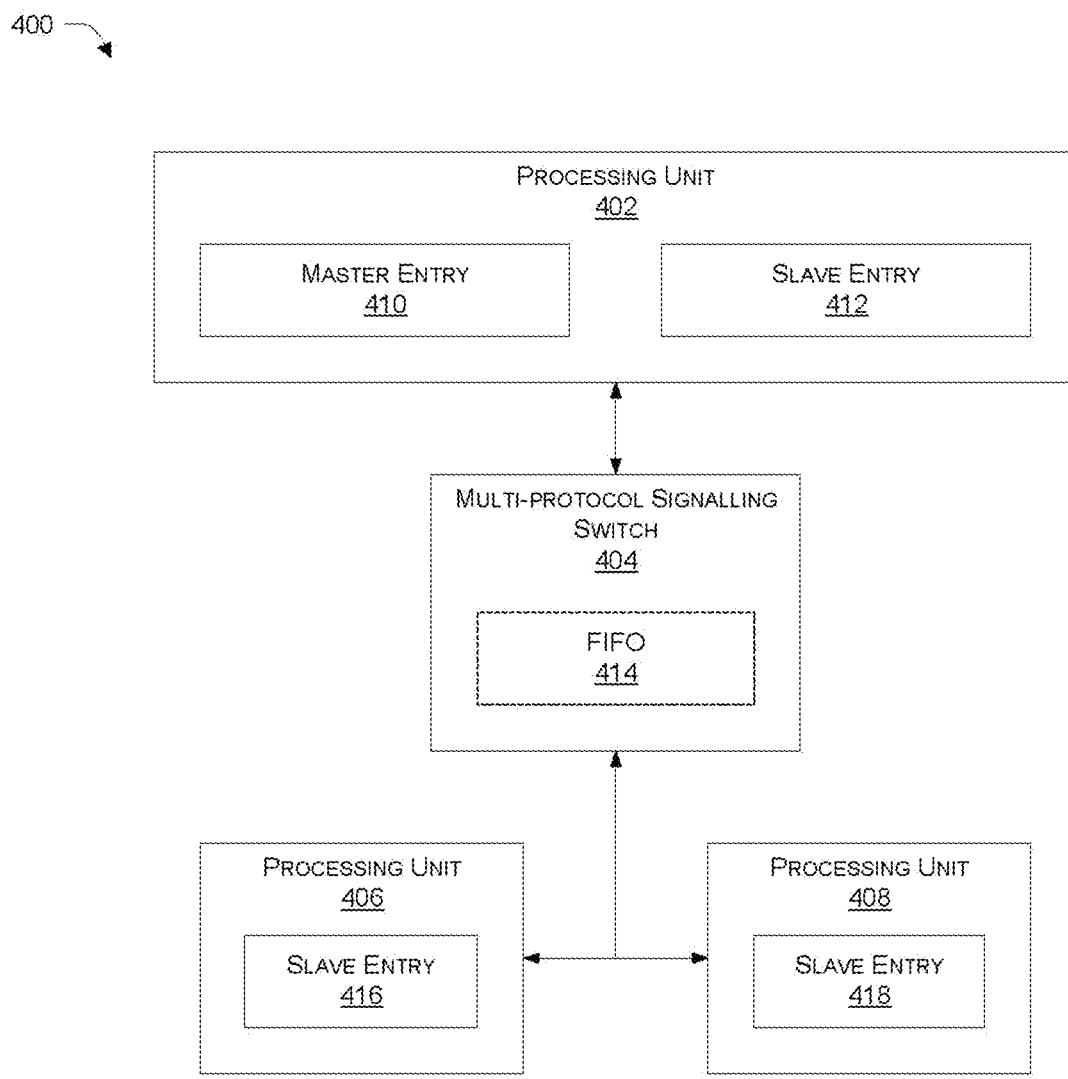
FIG. 4 is a block diagram illustrating inter-processor connectivity in accordance with an embodiment of the present disclosure.

FIG. 4 is a block diagram 400 illustrating inter-processor connectivity in accordance with an embodiment of the present disclosure. As shown in FIG. 4, metering functionality, for example, relating to a rate-limiting meter may be performed in a distributed manner. In the context of the present example, a processing unit 402 manages a master entry 410 as well as a slave entry 412 related to the particular meter. Other processing units, for example, processing unit 406 and processing unit 408 may each manage slave entry 416 and slave entry 418, respectively, for the particular meter.

In one embodiment, inter-processing unit communications are performed via exchange of messages via a multi-protocol signaling switch 404 that interconnects the processing units 402, 406, and 408. For example, when credit refresh conditions are met for slave entry 416 or 418, processing unit 406 or 408, respectively, may send a credit recharge request message to processing unit 402 though the switch 404, which maintains a First-In-First-Out (FIFO) data structure on which inter-processing unit messages are queued for delivery. To ensure fairness and consistent operations, in one embodiment, despite the master entry 410 and the slave entry 412 being managed by the same processing unit 402, the processing unit 402, follows the same convention of sending a credit recharge request message (to itself) via the switch 404 when credit refresh conditions are met for slave entry 412.

While in the context of the present example, a master entry and corresponding slave entries are shown for one meter, it is to be understood that additional master entries and corresponding slave entries may be implemented to support other meters.

Similarly, while in the context of the present example, three processing units are shown, depending on the implementation of the particular network device at issue, more or fewer processing units may be present.

Figure 5:
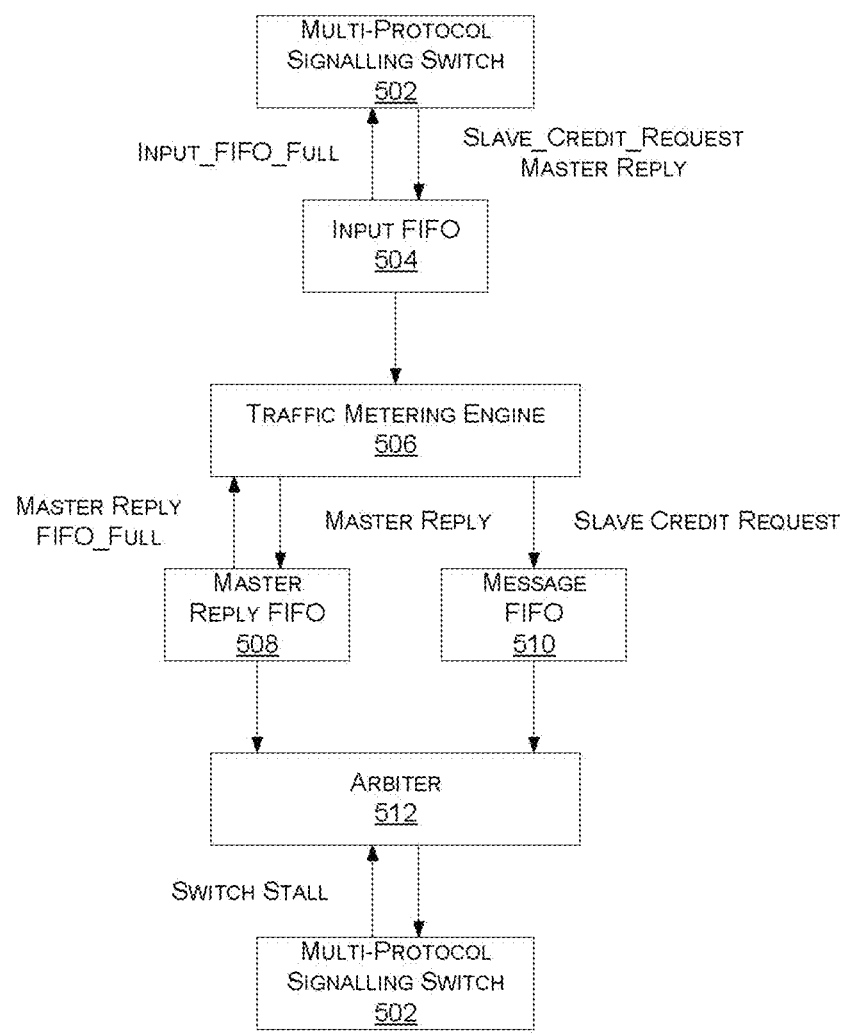
FIG. 5 is a block diagram illustrating intra-processor communication in accordance with an embodiment of the present disclosure.

FIG. 5 is a block diagram 500 illustrating intra-processor communication in accordance with an embodiment of the present disclosure. In the context of the present example, a processing unit (e.g., processing unit 106*a-c*, 302, 304, 402, 406, or 408) includes an input FIFO 504, a traffic metering engine 506, a master reply FIFO 508, a message FIFO 510, and an arbiter 512. The input FIFO 504 and the arbiter 512 are coupled to a multi-protocol signaling switch 502 (which represents a non-limiting example of switch 404 or switch 306).

In one embodiment, incoming messages (e.g., a slave credit request or a master reply) from other processing units (not shown) are received by the input FIFO 504 from the switch 502. The input FIFO 504 may provide status information (e.g., indicating whether the input FIFO 504 is full) to throttle incoming messages. Depending upon the particular role in which the traffic metering engine 506 (which may be referred to simply as a meter) is operating, the meter 506 may send a credit recharge request message via the switch 502 or may reply to a credit recharge request message with a credit grant message. The switch 502 may provide status information (e.g., a switch stall status indicating whether the switch FIFO is full) to the processing unit. When the traffic metering engine 506 attempts to send a message when the switch 502 is unable to accept the message, then the message may be queued on an appropriate FIFO (e.g., the master reply FIFO 508 or the message FIFO 510) to be transmitted by the arbiter 512 when the switch 502 can accept the message. In one embodiment, the master reply FIFO 508 is greater in size than the input FIFO 504 to ensure every master reply will reach the destination processing unit managing the slave entry associated with the master reply.

FIG. 6A is a table 600 illustrating fields of a credit request message in accordance with an embodiment of the present disclosure. In the context of the present example, a credit request message may be represented within a single quadword including an address of the slave entry at issue and a chip ID of the processing unit at issue. Depending upon the particular implementation, additional fields may be used. For example, in an implementation in which multiple types of credits may be requested, bit flags may be used to indicate which type of credit is being requested.

FIG. 6B is a table 650 illustrating fields of a credit grant message in accordance with an embodiment of the present disclosure. In the context of the present example, a credit grant message may be represented as two quadwords including an address of the slave entry to which credit is being granted and a number of credits being granted.

The various modules and engines described herein and the processing described below with reference to the flow diagrams of FIGS. 7-9 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 10 below.

Figure 7A:
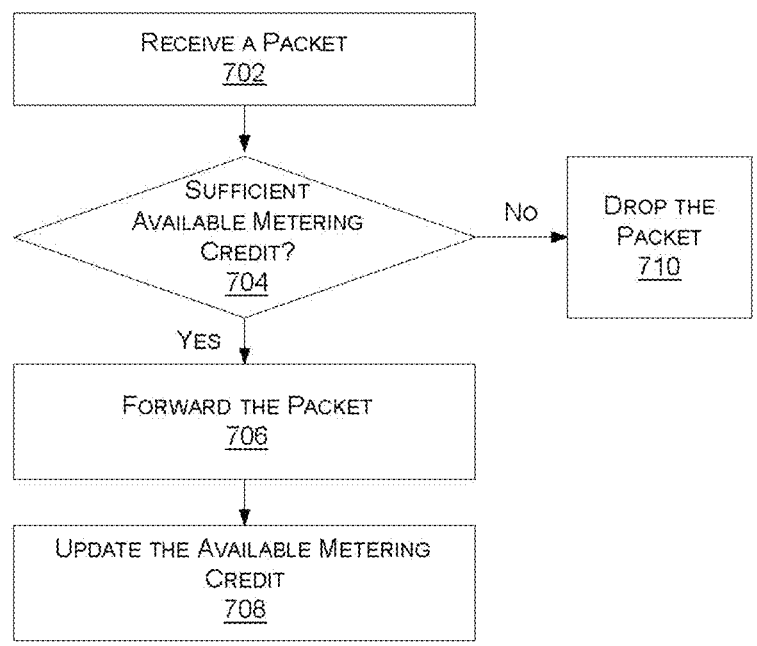
FIG. 7A is a flow diagram illustrating metering processing performed by a processing unit managing a slave entry of a meter in accordance with an embodiment of the present disclosure.

FIG. 7A is a flow diagram 700 illustrating metering processing performed by a processing unit managing a slave entry of a meter in accordance with an embodiment of the present disclosure. In the context of the present example, metering processing starts at block 702 in which a packet is received by a slave processing unit (e.g., processing unit 106a-c, 304, 402, 406, 408). As noted above, the slave processing unit may be one of multiple NPs implemented within a network device (e.g., network device 104) among which management of a number of master and slave entries is distributed.

At decision block 704, a determination is made regarding whether there is sufficient available metering credit to allow the packet to pass. In one embodiment, a traffic metering engine (e.g., traffic metering engine 506) of a processing unit (e.g., processing unit 406 or 408) determines the number of metering credits required to process (e.g., forward) the packet. The number of credits required to process a particular packet may vary depending upon the type and nature of the meter at issue. For example, a packet-rate meter may only require one credit to process one packet, whereas a byte-rate meter requires one credit for each byte of the packet. In any event, after determining the number of metering credits required to process the packet, the traffic metering engine may then compare the available metering credit specified by its slave entry (e.g., slave entry 416 or 418) to the number of metering credits required to process the packet. When the number of metering credits required for processing the packet at issue is less than or equal to the available metering credit, then there is sufficient available metering credit and processing proceeds with block 706; otherwise, there is insufficient available metering credit and processing branches to block 710 where the packet is dropped.

At block 706, the packet is forwarded. According to one embodiment, this involves allowing the packet to pass to a subsequent stage of packet processing. Depending upon the number of meters applicable to the packet at issue, the subsequent stage may include application of rate-limiting by a another meter of multiple meters applicable to the packet or if this is the only or last meter applicable to the packet at issue, then the subsequent stage may involve transmission of the packet onto a network to which the network device is coupled.

At block 708, the available metering credit is updated. For example, the traffic metering engine may update the available metering credit by deducting the metering credits required for processing the packet.

Figure 7B:
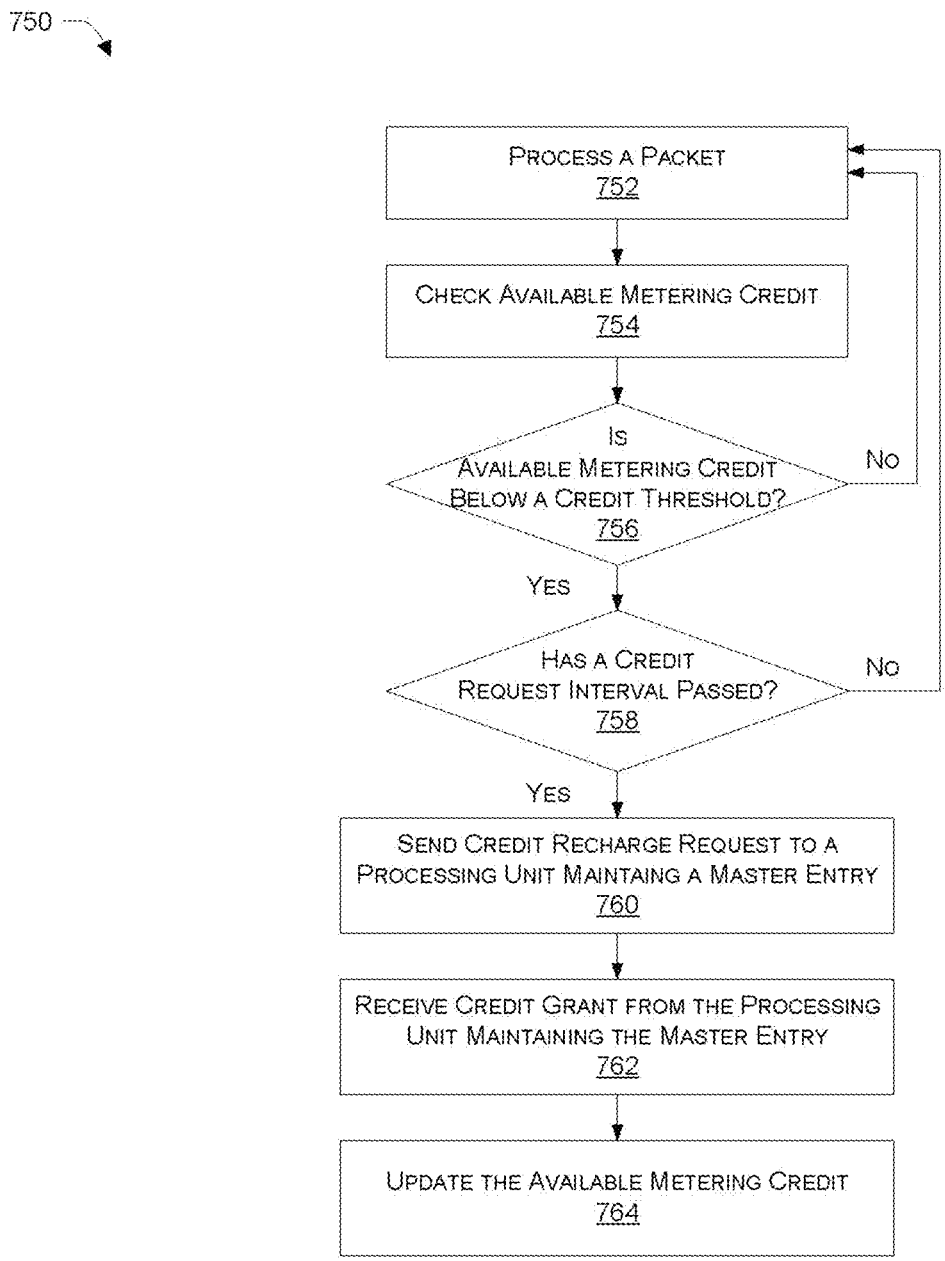
FIG. 7B is a flow diagram illustrating credit request processing performed by a slave processing unit for a particular meter in accordance with an embodiment of the present disclosure.

FIG. 7B is a flow diagram 750 illustrating credit request processing performed by a slave processing unit for a particular meter in accordance with an embodiment of the present disclosure. Before describing the flow diagram 750 it is helpful to provide a bit of background regarding various parameters of metering credit distribution, including a credit request interval and a credit threshold.

In one embodiment a credit threshold value is associated with each meter to indicate at what point a slave processing unit should request additional credits for its meter. According to one embodiment, the slave processing units are given an opportunity to request credits one or more times during each interval of time during which the credits are refreshed at the master processing unit (refresh_interval). As those skilled in the art will appreciate, the to ensure an orderly and fair distribution of credits among all slave processing units, the more frequently the slave processing units are permitted to request additional credits, the fewer credits they should be able to request during each opportunity and vice versa. For example, the credit threshold may be determined as a function of a defined rate at which the credits of the master processing unit are refreshed (rate) and the interval of time during which the credits are refreshed at the master processing unit (refresh_interval). In one embodiment, the credit threshold is determined as follows:

$$\text{Credit threshold} = rate * rate\_thold\_frac * req\_intv\_frac * refresh\_interval \qquad \text{EQ \#1}$$

$$\text{Request Interval} = req\_intv\_frac * refresh\_interval \qquad \text{EQ \#2}$$

where, rate_thold_frac represents the slave processing unit request rate threshold as a fraction of the rate; and req_intv_frac represents the slave processing unit request interval as a fraction of the refresh interval.

Returning now to the flow diagram 750, at block 752, a packet is processed (e.g., dropped or forwarded to a subsequent processing stage) at a slave processing unit (e.g., processing unit 406 or 408). According to one embodiment, the packet may be processed in accordance with the flow diagram 700 of FIG. 7A.

At block 754, the available metering credit is checked. For example, the slave processing unit may retrieve the currently credit value of a slave entry of a meter.

At decision block 756, a determination is made regarding whether the available metering credit is below a credit threshold. In one embodiment, the credit threshold is determined in accordance with EQ #1 above. When the available metering credit is below the credit threshold, processing continues with decision block 758; otherwise, processing loops back to block 752.

At decision block 758, a determination is made regarding whether a credit request interval has passed. According to one embodiment, the slave processing unit stores a time stamp indicating a time at which it last made a credit recharge request for this meter. As such, the slave processing unit may determine how much time has passed since its last credit recharge request by subtracting the that time stamp from the current time. This elapsed time since the last credit recharge request may then be compared to the credit request interval to determine whether it is permissible to make another credit request at this time. When the credit request interval has passed, processing continues with block 760; otherwise, processing loops back to block 752. According to one embodiment, to ensure that each slave processing unit managing a respective slave entry corresponding to a particular master entry obtains a fair amount of credits, the request interval between each credit recharge request from different processing units may be randomized. The randomized request interval may mitigate a scenario in which one slave processing unit consistently requests ahead of other slave processing units and obtains all the credits from the master processing unit. For example, according to one embodiment, the elapsed time since the last credit recharge request may be compared to a random fraction of the request interval as follows:

$$CTS-TS > \text{request interval} * \text{rand}(0.5,1) \qquad \text{EQ \#3}$$

where,

CTS represents the current time stamp;

TS represents the time stamp of the last credit recharge request;

rand(0.5,1) is a function that randomly generates a random coefficient between 0.5 and 1, inclusive.

At block 760, as the credit refresh conditions have been met, the slave processing unit sends a credit recharge request message to the master processing unit.

At block 762, the slave processing unit receives a credit grant message responsive to the credit recharge request message sent at block 760.

At block 764, the slave processing unit updates the available metering credit of the meter to include credits specified in the credit grant message.

While in the example described above, an evaluation of whether to request additional credits from the master processing unit is described as being performed after processing of each packet, in alternative embodiments this evaluation may be performed as part of the metering processing described with reference to FIG. 7A (e.g., responsive to the "no" branch of decision block 704), responsive to expiration of a timer or responsive to an event.

Figure 8:
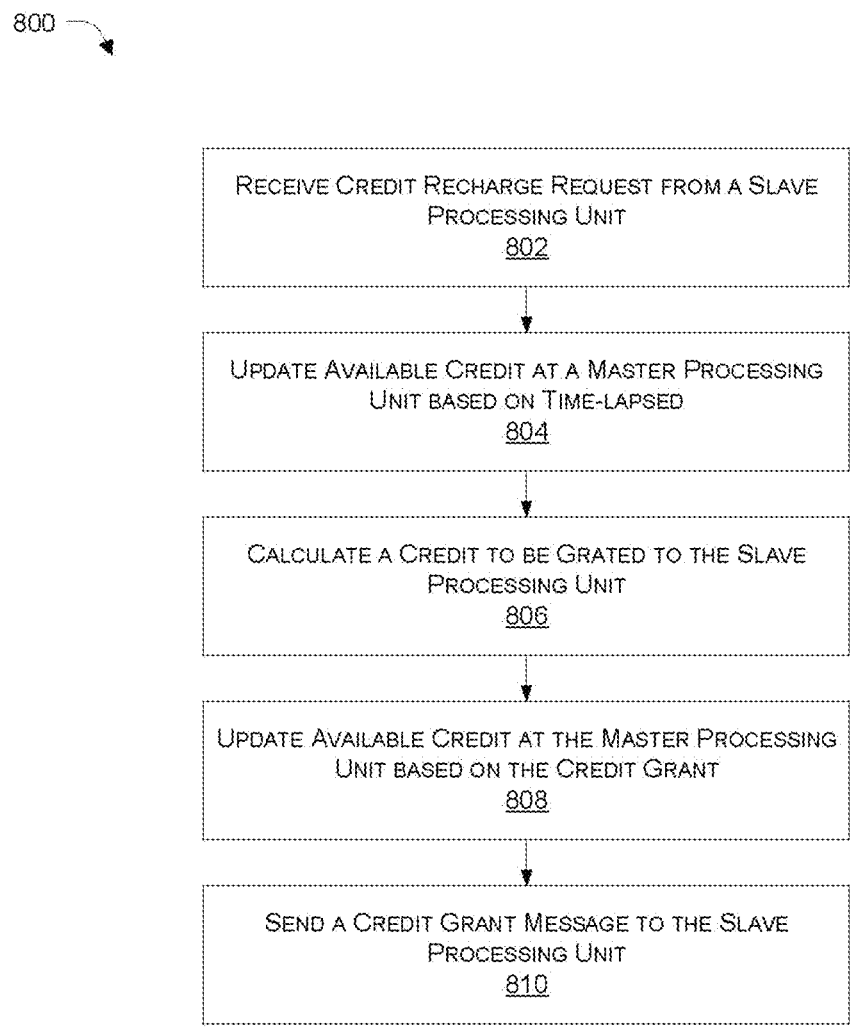
FIG. 8 is a flow diagram illustrating credit request processing performed by a master processing unit for a particular meter in accordance with an embodiment of the present disclosure.

FIG. 8 is a flow diagram illustrating credit request processing performed by a master processing unit for a particular meter in accordance with an embodiment of the present disclosure. At block 802, a credit recharge request is received by a master processing unit from a slave processing unit for a particular meter (e.g., as indicated by a slave entry address specified in the request).

At block 804, the master processing unit updates the available credit based on an amount of time that has lapsed since it last accumulated credits for this meter. In an embodiment, responsive to receipt of a credit recharge request from a slave processing unit, the master processing unit updates its credit first before determining an amount of credit to be granted to the slave processing unit. For example, the master processing unit may increase its available credit proportionate to the fraction of time of the refresh interval that has passed since the last credit accumulation.

At block 806, an amount of credit to be granted to the slave processing unit is calculated. According to one embodiment, the credit distribution scheme seeks to achieve the same metering results as if all flows and metering entries were on a single chip. This translates into the following two general guidelines:

During a period of time, if only one slave processing unit requests credits, all credits should be granted to that slave processing unit.

If multiple slave processing units request credits during the same time frame, each slave processing unit should obtain fair amount of credits.

To meet the first guideline, the maximum credit the master can grant should be request_interval*rate to ensure one slave processing unit can obtain all the credits if it is the only requester. To meet the second guideline, the request intervals between each slave requests should be randomized at the request time (as discussed above with reference to block 758 of FIG. 7B). This random "back off" seeks to avoid one slave requesting consistently ahead of another slave to obtain all credits.

According to one embodiment, the number of credits granted (Credit grant) to the requesting slave processing unit is determined as follows:

$$\text{Credit grant} = \min(\text{request\_interval} * \text{rate}, \text{available credit}). \qquad \text{EQ \#4}$$

At block 808, the master processing unit updates the available credit based on the credit grant (e.g., by subtracting the credit grant from the available credit).

At block 810, a credit grant message is sent to the slave processing unit containing the granted credit value (Credit grant). If there is no available credit, the granted credit value may be zero.

While in the context of the present example, the update of available credit at the master processing unit is shown as being part of the processing relating to credit request processing, in alternative embodiments, this credit refresh at the master processing unit may be performed independently (e.g., as part of a separate thread or task), responsive to expiration of a timer or responsive to an event.

Figure 9:
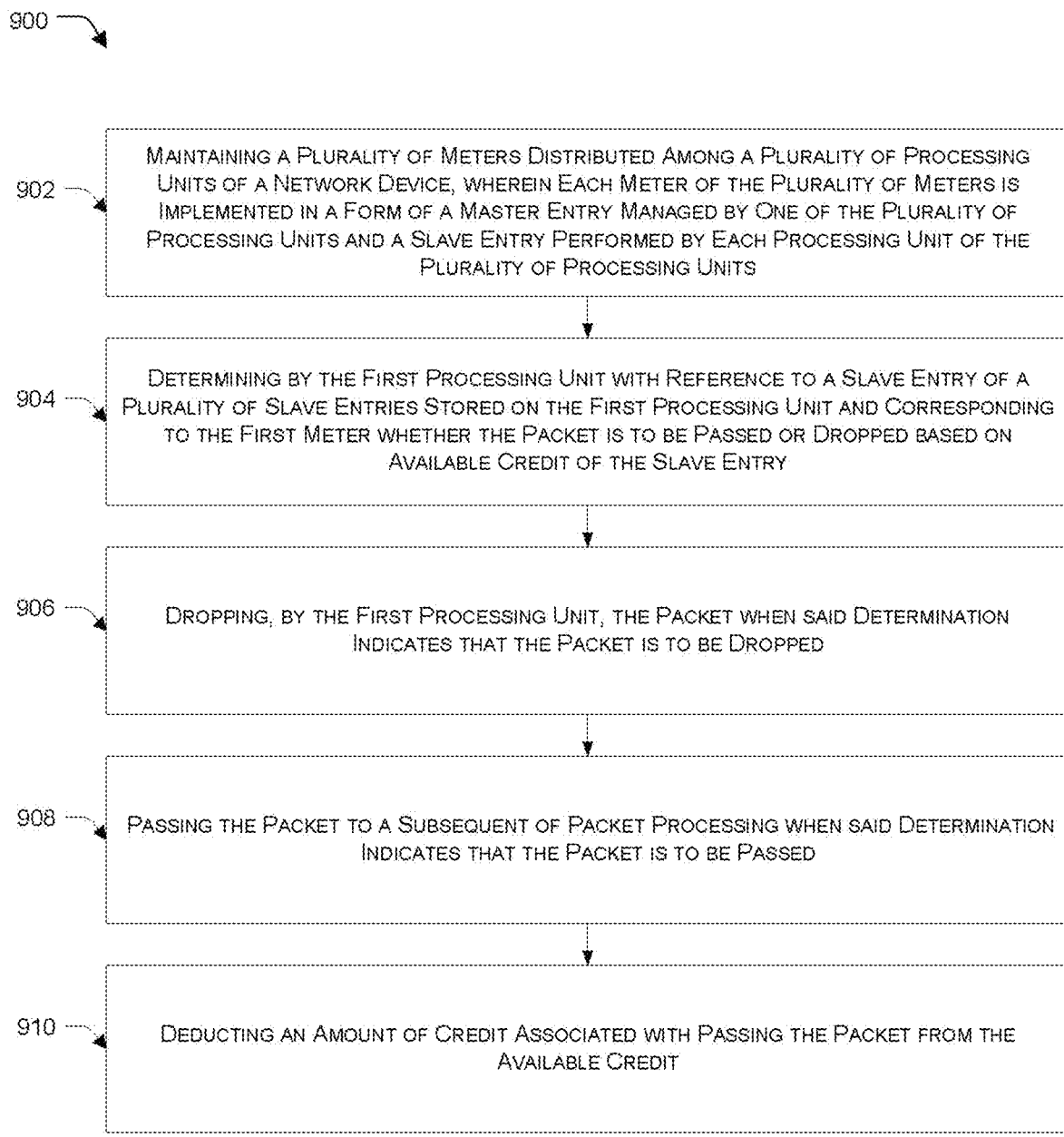
FIG. 9 is a flow diagram illustrating processing associated with a packet drop/pass decision by a processing unit in accordance with an embodiment of the present disclosure.

FIG. 9 is a flow diagram illustrating processing associated with a packet drop/pass decision by a processing unit in accordance with an embodiment of the present disclosure. In an embodiment, a process 900 associated with packet drop or pass decision includes a step of maintaining a plurality of meters distributed among a plurality of processing units of a network device as shown at block 902, wherein each meter of the plurality of meters is implemented in a form of a master entry stored on one of the plurality of processing units and a slave entry stored on each processing unit of the plurality of processing units. The process 900 includes a step of determining by the first processing unit with reference to a slave entry of a plurality of slave entries stored on the first processing unit and corresponding to the first meter whether the packet is to be passed or dropped based on available credit of the slave entry, responsive to receipt of a packet by a first processing unit of the plurality of processing units that is subject to rate-limiting by a first meter of the plurality of meters as shown at block 904. The process 900 further includes steps dropping, by the first processing unit, the packet when said determination indicates that the packet is to be dropped as shown at block 906, and passing the packet to a subsequent of packet processing when said determination indicates that the packet is to be passed as shown at block 908, and deducting an amount of credit associated with passing the packet from the available credit as shown at block 910.

The method further includes steps of sending, by the first processing unit, a credit request message to a second processing unit of the plurality of processing units on which the master entry of the first meter is stored, responsive to one or more credit refresh conditions being met for the slave entry, receiving at the first processing unit a credit grant via a credit grant message from the second processing unit, and updating by the first processing unit the available credit based on the credit grant.

Various methods described herein may be practiced by combining one or more machine-readable storage media containing the code according to example embodiments described herein with appropriate computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 10:
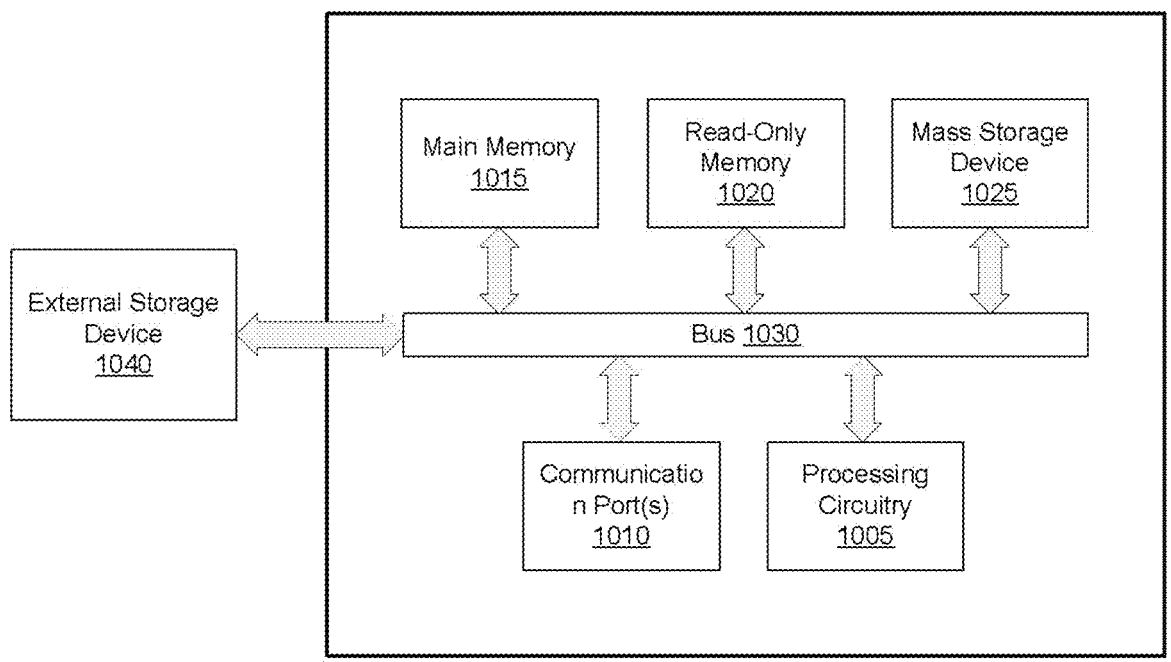
FIG. 10 illustrates an exemplary computer system in which or with which embodiments of the present invention may be utilized.

FIG. 10 illustrates an exemplary computer system in which or with which embodiments of the present invention may be utilized. As shown in FIG. 10, a computer system includes an external storage device 1040, a bus 1030, a main memory 1015, a read-only memory 1020, a mass storage device 1025, a communication port 1010, and one or more processing resources (e.g., processing circuitry 1005). Computer system 1000 may represent some portion of a network device (e.g., network device 104 or 202). The network device may be a switch, a router or a network security device.

Those skilled in the art will appreciate that computer system 1000 may include more than one processor and communication ports 1010. Examples of processing circuitry 1005 include, but are not limited to, an Intel® Itanium® or Itanium 2 processor(s), or AMD® Opteron® or Athlon MP® processor(s), Motorola® lines of processors, FortiSOC™ system on chip processors or other future processors. Processing circuitry 1005 may include various modules associated with embodiments of the present invention.

Communication port 1010 can be any of an RS-232 port for use with a modem-based dialup connection, a 10/100 Ethernet port, a Gigabit or 10 Gigabit port using copper or fiber, a serial port, a parallel port, or other existing or future ports. Communication port 1010 may be chosen depending on a network, such as a Local Area Network (LAN), Wide Area Network (WAN), or any network to which the computer system connects.

Memory 1015 can be Random Access Memory (RAM), or any other dynamic storage device commonly known in the art. Read-Only Memory (ROM) 1020 can be any static storage device(s) e.g., but not limited to, a Programmable Read-Only Memory (PROM) chips for storing static information e.g. start-up or BIOS instructions for processing circuitry 1005.

Mass storage 1025 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1030 communicatively couples processing circuitry 1005 with the other memory, storage, and communication blocks. Bus 1030 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing circuitry 1005 to a software system. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Their respective functions may be carried out through the operation of program logic, through dedicated logic, through the interaction of program control and dedicated logic. Those of ordinary skill in the art further understand that the exemplary hardware, software, processes, methods, and/or operating systems described herein are for illustrative purposes and, thus, are not intended to be limited to any explicitly called out herein.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   maintaining a plurality of meters management of which is distributed among a plurality of processing units of a network device, wherein each meter of the plurality of meters is implemented in a form of a master entry managed by one of the plurality of processing units and a slave entry managed by each processing unit of the plurality of processing units;
   receiving, by a first processing unit of the plurality of processing units, a credit request message relating to a slave entry associated with a first meter of the plurality of meters and corresponding to a particular master entry of a plurality of master entries managed by the first processing unit;
   responsive to the credit request message:
   calculating, by the first processing unit, a number of credits to be granted to the slave entry based on an available credit of the particular master entry;
   deducting, by the first processing unit, the number of credits from the available credit;
   granting, by the first processing unit, the number of credits to the slave entry by sending a credit grant message indicating the number of credits to a processing unit of the plurality of processing units managing the slave entry.

2. The method of claim 1, further comprising responsive to expiration of a predetermined or configurable amount of time, increasing the available credit by a predetermined or configurable credit accumulation amount.

3. A network device comprising:
   a memory;
   a plurality of network processors (NPs) coupled to the memory;
   a processing resource; and
   a non-transitory computer-readable medium, coupled to the processing resource, having stored therein instructions that when executed by the processing resource cause the processing resource to:
   distribute management of a plurality of meters among the plurality of NPs, wherein each meter of the plurality of meters is implemented in a form of a master entry managed by one of the plurality of NPs and a slave entry managed by each NP of the plurality of NPs;
   causing a packet that is subject to rate-limiting by a first meter of the plurality of meters to be directed to a first NP of the plurality of NPs, wherein the first NP:
   determines with reference to a slave entry of a plurality of slave entries managed by the first NP unit and corresponding to the first meter whether the packet is to be passed or dropped based on available credit of the slave entry, wherein the slave entries are stored in the memory;
   when the packet is to be dropped, the first NP drops the packet;
   when the packet is to be passed, the first NP:
   deducts an amount of credit associated with passing the packet from the available credit; and
   allows the packet to be passed to a subsequent stage of packet processing wherein responsive to one or more credit refresh conditions being met for the slave entry:
   the first NP sends a credit request message to a second NP of the plurality of NPs by which the master entry of the first meter is managed;
   the first NP receives a credit grant via a credit grant message from the second NP unit; and
   the first NP updates the available credit based on the credit grant.

4. The network device of claim 3, wherein the available credit represents a bandwidth limit specified in terms of a packet rate, a frame rate, a byte rate, or a bit rate.

5. The network device of claim 3, wherein the available credit represents a burstiness limit specified in terms of a jitter tolerance, a delay variation tolerance, or a maximum burst size.

6. The network device of claim 3, wherein the one or more credit refresh conditions include the available credit being below a credit threshold and expiration of a request interval.

7. The network device of claim 3, wherein the subsequent stage comprises application of rate-limiting by a second meter of the plurality of meters.

8. The network device of claim 3, wherein the subsequent stage comprises transmission of the packet onto a network to which the network device is coupled.

9. A non-transitory computer-readable media, storing source code that, when executed by a processor, performs a method comprising:
   maintaining a plurality of meters management of which is distributed among a plurality of processing units of a network device, wherein each meter of the plurality of meters is implemented in a form of a master entry managed by one of the plurality of processing units and a slave entry managed by each processing unit of the plurality of processing units;
   receiving, by a first processing unit of the plurality of processing units, a credit request message relating to a slave entry associated with a first meter of the plurality of meters and corresponding to a particular master entry of a plurality of master entries managed by the first processing unit;
   responsive to the credit request message:
   calculating, by the first processing unit, a number of credits to be granted to the slave entry based on an available credit of the particular master entry;
   deducting, by the first processing unit, the number of credits from the available credit;
   granting, by the first processing unit, the number of credits to the slave entry by sending a credit grant message indicating the number of credits to a processing unit of the plurality of processing units managing the slave entry.

\* \* \* \* \*